United States Patent [19]
Wurmser et al.

[11] Patent Number: 5,009,474
[45] Date of Patent: Apr. 23, 1991

[54] PROTECTION DEVICE FOR A FIBER LIGHT CONDUCTOR JUNCTION

[75] Inventors: Ulrich Wurmser, Rottach-Egern; Josef Meyer, Grosshelfendorf, both of Fed. Rep. of Germany

[73] Assignee: Messerschmitt-Boelkow-Blohm GmbH, Munich, Fed. Rep. of Germany

[21] Appl. No.: 434,407

[22] Filed: Nov. 8, 1989

[30] Foreign Application Priority Data

Nov. 10, 1988 [DE] Fed. Rep. of Germany ....... 3838075

[51] Int. Cl.$^5$ .............................................. G02B 6/38
[52] U.S. Cl. ................................. 350/96.2; 350/96.21
[58] Field of Search .................. 350/96.2, 96.21, 96.23

[56] References Cited

U.S. PATENT DOCUMENTS

| | | | |
|---|---|---|---|
| 4,730,890 | 3/1988 | Kashimura et al. | 350/96.2 |
| 4,738,504 | 4/1988 | Jones | 350/96.2 |
| 4,738,505 | 4/1988 | Jones | 350/96.2 |
| 4,799,760 | 1/1989 | Beatty et al. | 350/96.2 X |
| 4,846,545 | 7/1989 | Estabrook et al. | 350/96.21 |

FOREIGN PATENT DOCUMENTS

| | | |
|---|---|---|
| 3428815 | 2/1986 | Fed. Rep. of Germany. |
| 61-102611 | 5/1986 | Japan ................................ 350/96.21 |

Primary Examiner—John D. Lee
Assistant Examiner—John Ngo
Attorney, Agent, or Firm—W. G. Fasse; D. H. Kane, Jr.

[57] ABSTRACT

The junction between two optical fiber light conductors is protected by a sleeve envelope which connects the protection coatings directly to each other. Tension resistent filler fibers are compressed by a shrink fit inside the sleeve envelope so that tension stress bypasses the light conductor fibers through the filler fibers. The sleeve envelope ends are shrink fitted to the protection coating. The highly tension resistant filler fibers, surrounding and bridging the junction, are tightly enclosed in the sleeve envelope by the shrink fit so that tension stress also passes through the filler fibers, thereby permitting the sleeve envelope to perform its protection function while the filler fibers provide the required strength.

5 Claims, 1 Drawing Sheet

PROTECTION DEVICE FOR A FIBER LIGHT CONDUCTOR JUNCTION

FIELD OF THE INVENTION

The invention relates to a device for protecting a junction between the ends of two fiber light conductors to mechanically secure the fiber light conductors against damages.

BACKGROUND INFORMATION

It is customary to protect the junctions between the ends of two optical fiber light conductors from which the insulation or protection coating has been bared, by encasing the ends in a pourable and hardenable synthetic resin mass. It is also known to enclose such junctions simply with a sleeve envelope. Such junctions are needed, for example, in conductor coils for light waves, in electro-optical structural components, and the like. Both, the sleeve envelope and the encasing with a synthetic resin mass do not provide a protection of the light conductor junction against damages by tearing, whereby the light conductor fiber ends may fan out through a tear. Such damages may be caused by temperature variations which must be taken into account, especially where such fiber light conductors are used in connection with space technology applications.

OBJECTS OF THE INVENTION

In view of the above it is the aim of the invention to achieve the following objects singly or in combination: to provide a protection device for fiber light conductor junctions which will avoid the problems mentioned above, specifically, to protect the junction and the light conductor fibers against damage by tearing; to provide a protection device which will transmit tension loads across the junction without applying such tension loads to the fiber light conductors themselves; and to enclose highly tension resistant fibers in a sleeve envelope which will compress the fibers around the junction for the transmission of tension loads and preferably also resist shearing loads and to protect against buckling.

SUMMARY OF THE INVENTION

The above objects have been achieved by a protection device which is characterized according to the invention in that the protection coatings on the fiber light conductor ends are connected by a connection formed by a sleeve envelope capable of being shrink fitted, and by a filling inside the sleeve envelope, said filling comprising highly tension resistant fiber threads which are compressed inside the sleeve envelope by a heat shrinking of the sleeve envelope which is made of a shrinkable material. The fibers bridge at least the junction between the two light conductor ends and take up tension loads while the sleeve envelope performs its protection function. Preferably, the filler fibers reach into the shrink-fitted ends of the sleeve envelope for tightly securing the sleeve envelope and the highly tension resistant fibers to the protection coating of the light conductors. The invention provides a force transmitting fitting between, the filler fibers and the protection coating of the light conductor.

An even improved bonding or safe connection between the filler fiber ends and the protective coatings is achieved in a simple way by using as a sleeve envelope a hose of thermoplastic material, the inwardly facing surface of which is coated with an adhesive. Due to the thermal shrinking of the thermoplastic hose, the inwardly facing adhesive is squeezed into the spaces between neighboring filler fibers, thereby forming an adhesive material matrix between the fibers.

By inserting at least one metal wire into the compressed filler fibers, an effective protection against buckling and shearing stress is provided. The resistance against shearing stress and against buckling can be further increased by filling the free space inside the sleeve envelope, namely the space around the light conductor fiber ends which have been bared of the protective coating, with a thermoplastic potting mass.

The use of aramide fibers for the filler fibers which take up tension, increases greatly the ability of the protection device to withstand high temperatures including high temperature variations.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENTS AND OF THE BEST MODE OF THE INVENTION

Figure 1:
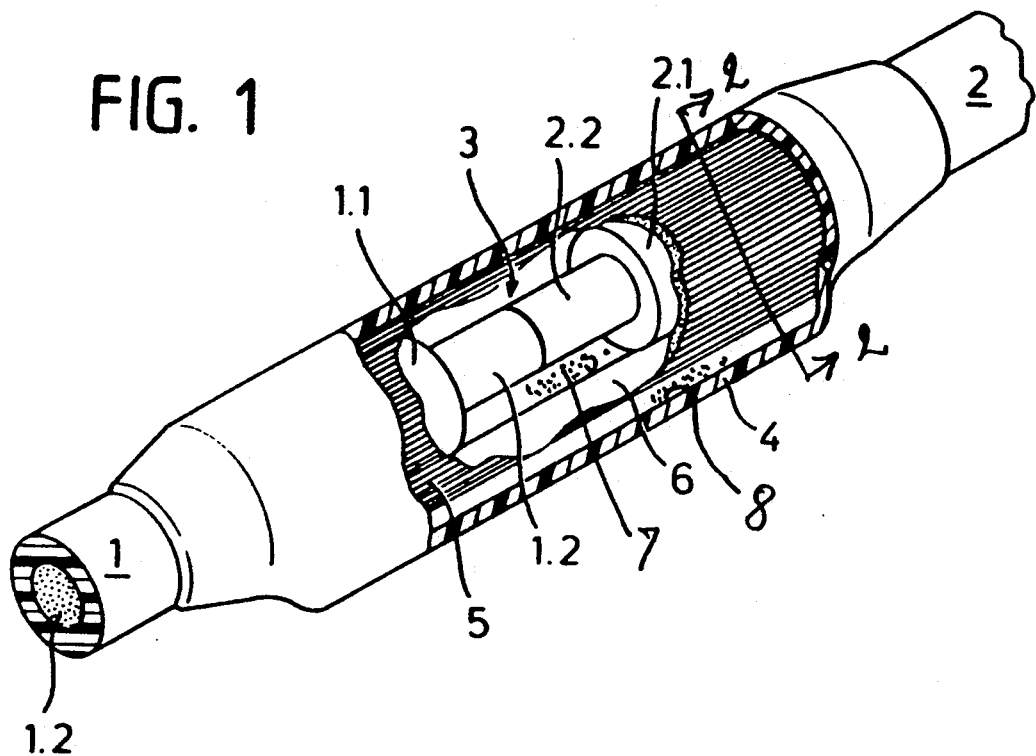
FIG. 1 is a perspective, partially broken open view of a protection device according to the invention protecting a junction between two light conductor fiber ends.
Figure 2:
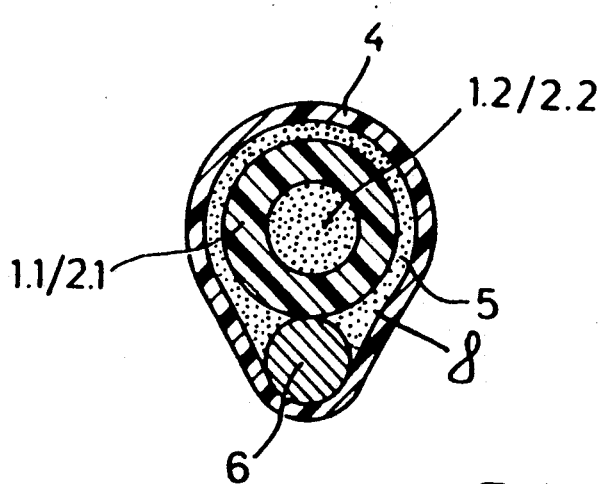
FIG. 2 is a sectional view along section line 2—2 in FIG. 1.

Referring to FIGS. 1 and 2, two optical fiber light conductors 1 and 2 are to be connected at a junction 3. Each fiber light conductor 1 and 2 comprises an internal core in the form of a light conductor fiber 1.2 and 2.2. These conductor fibers are enclosed by a protective coating or jacket 1.1 and 2.1 respectively. The junction facing ends of the conductor fibers 1.2 and 2.2 are bared of the protective coating or jacket 1.1 and 2.1 to form a free space, preferably filled with a thermoplastic potting or encasing mass 7.

The axially facing end surfaces of the conductor fibers 1.2 and 2.2 are welded to each other, for example, to provide a light conducting connection from one fiber to the other.

According to the invention a sleeve envelope 4 surrounds the junction 3 in such a way that the light conducting connection at the junction 3 between the conductor fibers 1.2 and 2.2 is relieved from any axially extending tensile stress. The sleeve 4 is made of a shrinkable material, for example, a thermoplastic synthetic material such as PTFE which is first pushed onto one conductor end before making the connection at the junction 3. However, the sleeve envelope 4 could also be formed by winding a length of shrinkable tape material around the fiber ends after the junction has been made, whereby a seam will be closed in the envelope by a heat welding or the like.

In both instances sufficient play will be left between the sleeve envelope 4 and the protection coating or jacket 1.1 and 2.1 for the insertion of tension resistant fiber threads 5, for example, of aramide or the like material. The fiber threads 5 bridge the junction 3 just as the sleeve itself. Thus, the fiber ends overlap the protection coatings or jackets 1.1 and 2.1. If now the sleeve envelope 4 is heat shrunk, it will compress the fibers 5, especially around the protection coating or jackets 1.1 and 2.1 so that a tension load resistant connection is formed between the protection coatings and the tension resistant fiber threads 5.

If desired metal wire 6 for example, of steel, may be inserted as shown in both FIGS. or providing an improved resistance against buckling and shearing stress. Such resistance is further improved by the above mentioned thermoplastic synthetic potting mass 7. The mass 7 may, for example, be injected through the envelope 4 to completely fill any internal voids.

In order to form a bonding material matrix between the tensile stress fibers 5 which form filler fibers inside the envelope 4, the inwardly facing surface of the envelope 4 may be coated with a bonding adhesive 8. Such an adhesive is pressed into the fibers during the heat shrinking, thereby embedding the fibers 5 in a matrix of bonding material.

Although the invention has been described with reference to specific example embodiments, it will be appreciated that it is intended to cover all modifications and equivalents within the scope of the appended claims.

What we claim is:

1. A protection device for a junction between two ends of fiber light conductors facing each other, comprising a protection jacket on each of said fiber light conductors, a sleeve envelope (4) of shrinkable material bridging said junction, a shrink fit between each end of said sleeve envelope and the respective protection jacket for securing said sleeve envelope to said protection jackets through said shrink fits, a fiber material filling in said sleeve envelope, said fiber material filling comprising uninterrupted tension resistant filler fibers bridging said junction inside said sleeve envelope, said filler fibers having such a length that each fiber end reaches into a respective shrink fit where said fiber ends are compressed directly between said sleeve envelope and said protection jacket by said shrink fit of said sleeve envelope on said protection jacket for transmitting tension loads substantially only through said tension resistant filler fibers.

2. The protection device of claim 1, wherein said sleeve envelope comprises a hose section of thermoplastic material, said hose section having an inwardly facing surface coated with an adhesive.

3. The protection device of claim 1, wherein said filler tension resistant fibers are aramid fibers.

4. The protection device of claim 1, further comprising at least one metal wire also bridging said junction in parallel to said filler fibers.

5. The protection device of claim 1, wherein said protection jacket is cut back to bare said light conductor fiber ends to form a free space around said light conductor fiber ends, said protection device further comprising a thermoplastic mass in said free space around said bared light conductor fiber ends inside said sleeve envelope, said thermoplastic mass being surrounded by said filler fibers.

* * * * *